United States Patent [19]

Strehler et al.

[11] Patent Number: 5,147,255

[45] Date of Patent: Sep. 15, 1992

[54] SPUR GEAR TRANSMISSION, IN PARTICULAR FOR A DRIVE UNIT OF AN INDUSTRIAL TRUCK

[75] Inventors: Richard Strehler, Chieming; Max Bartl, Munich, both of Fed. Rep. of Germany

[73] Assignee: Hurth Getriebe und Zahnraeder G.m.b.H., Munich, Fed. Rep. of Germany

[21] Appl. No.: 677,773

[22] Filed: Mar. 29, 1991

[30] Foreign Application Priority Data

Apr. 3, 1990 [DE] Fed. Rep. of Germany ....... 4010742
Apr. 7, 1990 [DE] Fed. Rep. of Germany ....... 4011304

[51] Int. Cl.$^5$ ............................................. F16H 3/44
[52] U.S. Cl. ................................. 475/311; 74/411.5; 192/4 A; 188/72.6; 475/900
[58] Field of Search ............. 475/311, 331, 900; 74/421 A, 411.5; 192/4 A; 188/71.1, 71.5, 72.6

[56] References Cited

U.S. PATENT DOCUMENTS

| | | | |
|---|---|---|---|
| 3,892,300 | 7/1975 | Hapeman et al. | 74/421 A |
| 4,037,694 | 7/1977 | Keese | 192/4 A |
| 4,114,479 | 9/1978 | Ashfield | 192/4 A |
| 4,461,373 | 7/1984 | Pratt et al. | 192/4 A |
| 4,465,169 | 8/1984 | Houtz | 192/4 A |
| 4,540,073 | 9/1985 | Rogier | 192/4 A |
| 4,649,772 | 3/1987 | Daniel et al. | 74/411.5 |
| 4,961,485 | 10/1990 | Huff et al. | 475/331 |

FOREIGN PATENT DOCUMENTS

2357451 5/1975 Fed. Rep. of Germany .
1455069 11/1976 United Kingdom .

*Primary Examiner*—Richard Lorence
*Assistant Examiner*—Benjamin Levi
*Attorney, Agent, or Firm*—Flynn, Thiel, Boutell & Tanis

[57] ABSTRACT

A spur gear transmission for a drive unit of an industrial truck having an integrated wet running disk brake. A first disk carrier is arranged on one of the spur gears. First braking disks are mounted on the disk carrier. A second disk carrier is fastened in the transmission housing, second braking disks being mounted on the second disk carrier, such that the first and the second braking disks are arranged alternately and cooperate. The spur gear having the first disk carrier is axially movable against the force of a spring by a pressure pin extending through the transmission housing and operable from outside, with the braking disks being pressed against one another between the spur gear and a bearing surface in the transmission housing. A two-arm lever is provided, one lever arm of which can be operated by the driver and the other lever arm of which lever rests on the pressure pin. A hydraulic cylinder with a movable piston therein is housed in the lever arm and is connected through a pipeline, for example, to a brake pedal, to be operated by the driver. The cylinder yields when the piston is loaded with pressure and operates thereby the pressure pin. Besides this hydraulic brake operation intended for the travelling operation there is also provided a mechanical operation through a cable line, which is, for example, connected to a brake lever, as a locking brake.

5 Claims, 3 Drawing Sheets

PRIOR ART

SPUR GEAR TRANSMISSION, IN PARTICULAR FOR A DRIVE UNIT OF AN INDUSTRIAL TRUCK

FIELD OF THE INVENTION

The invention relates to a spur gear transmission for an industrial truck.

BACKGROUND OF THE INVENTION

Such transmissions or rather drive units are among others utilized in industrial trucks as for example forklifts. A use is known from a Carl Hurth Maschinenund Zahnradfabrik GmbH & Co. (a/k/a/ HURTH Getriebe und Zahnraeder G.m.b.H.) reference entitled "HURTH Getriebe fuer Flurfoerderzeuge Baureihe HFS" (Hurth Drive Units for Industrial Trucks HFS Line) dated February, 1988, where such use is illustrated in a significantly simplified manner in FIG. 1 of the drawings accompanying this text. Two drive units 4, 5 are arranged in a mirror-image fashion to one another to function as a double drive mounted on side frame members 1, 2 of a front-drive industrial truck (not illustrated in detail), which side frame members are connected to each other through transversely extending bars 3. Each drive unit consists of a spur gear transmission 7, to which an electric motor 6 is connected and on the driven shaft of which, which is constructed as a wheel shaft 8, is mounted a drive wheel 9. A combination wheel and blocking brake 10 is provided on the sides of each of the electric motors 6 remote from the transmissions 7. FIG. 1 clearly permits one to recognize that the brakes 10 take up almost all the space (distance a) remaining between the motors 6 so that neither larger, namely, in particular longer, electric motors can be used nor is a reduction in the frame width b possible.

Therefore, the basic purpose of the invention is to provide a drive unit of the above-mentioned type such that, while reducing the space a existing up to now between the electric motors 6, larger, namely, longer electric motors with higher performance can be installed and/or the frame width b can be reduced, which up to now was prevented by the existing arrangement of the brakes 10.

This purpose is attained according to the invention by the brakes being integrated into the transmissions.

A brake also integrated in a drive unit for an industrial truck, which brake is operated from outside by a bent double lever, is known from DE 23 57 451 C2, however, the known brake cannot be utilized in the present case: On the one hand, the operating levers passing by on the outside of the drive wheels would further increase the total width of the drive unit, and on the other hand, no structural part, to which the operating levers could be hinged, exists above or in front of or behind the drive wheels 9.

The spur gear transmissions for the mentioned use must as a rule be designed in two steps in order to be able to house the necessary translation. Particularly advantageous is thereby that the axial distance between the spur gears of the first step and the planetary gear set of the second step must not be enlarged compared with the known design. This means that the brake integrated into the transmission does not require any additional space.

The disk brake known from the above-mentioned DE 23 57 451 C2 can only be operated mechanically. A hydraulic operation is not possible here since in transmissions for industrial trucks the space needed for cylinders, pistons, seals, etc. is usually not available.

A further development of the invention includes the provision of a disk brake of the mentioned type, in which a hydraulic operation is possible without requiring additional space inside the transmission housing. The integration of the hydraulic cylinder into the operating lever thereby brings about several surprising advantages: A very small cylinder diameter is possible due to the leveraging capability of the operating lever, the transmission oil within the transmission housing and the brake fluid are spacially completely separated from one another without expensive and complicated seals, and the lever with the hydraulic cylinder thereon, which is to be viewed as a wear part, can be exchanged in a service-friendly manner—without having to remove the transmission from the truck and without having to disassemble the transmission.

BRIEF DESCRIPTION OF THE DRAWINGS

The invention will be described hereinafter in connection with one exemplary embodiment, which is illustrated in FIGS. 2 to 8, in which.

DETAILED DESCRIPTION

Figure 1:
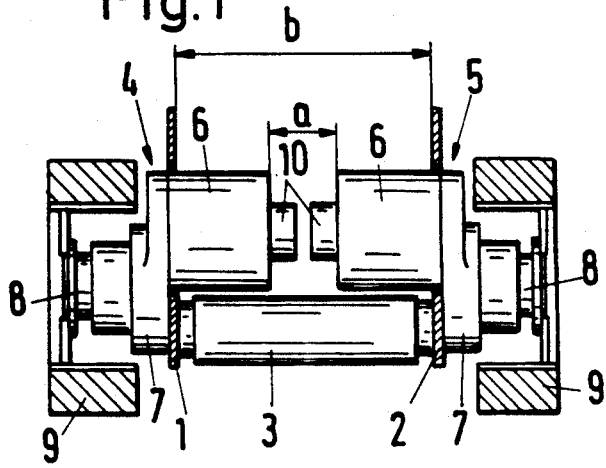
FIG. 1 illustrates a prior art transmission arrangement.
Figure 2:
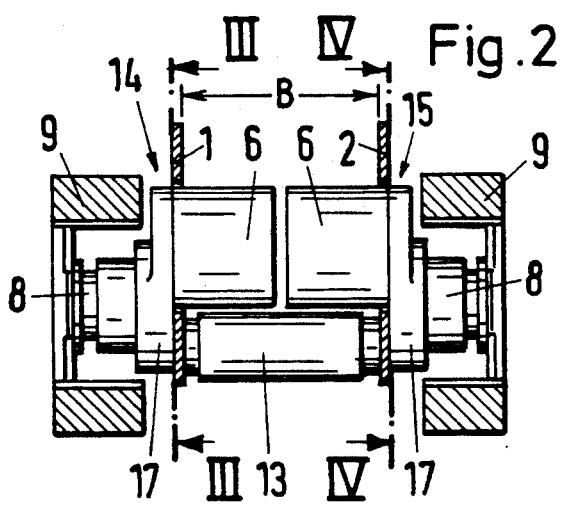
FIG. 2 illustrates a double drive transmission arrangement analogous to FIG. 1, however, with a reduced frame width, which is made possible by the invention.
Figures 3, 4:
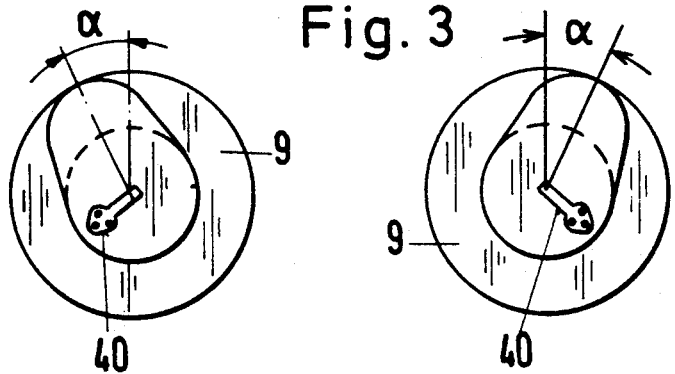
FIGS. 3 and 4 illustrate the two wheels viewed in arrow direction III or rather IV.

The side frame members 1, 2 of the double drive illustrated in FIGS. 2 to 4 are connected with one another through transversely extending bars 13 which are shorter compared to the ones of FIG. 1. Two drive units 14, 15 are connected to and partially guided through openings provided in the side frame members 1, 2. Each of the drive units consists of an electric motor 6, a transmission 17 with an integrated brake and a drive wheel 9 mounted on a driven shaft of the transmission 17. The entire width B, which is significantly less than the width b compared with the double drive of FIG. 1 but has the same motors 6 and the same wheels 9, can be clearly recognized. In order to keep the over-all height low, the transmissions 17 are each rotated at an angle α about the axis of the wheel shaft 8 and from a vertically upright position, as shown in FIGS. 3 and 4.

Figure 5:
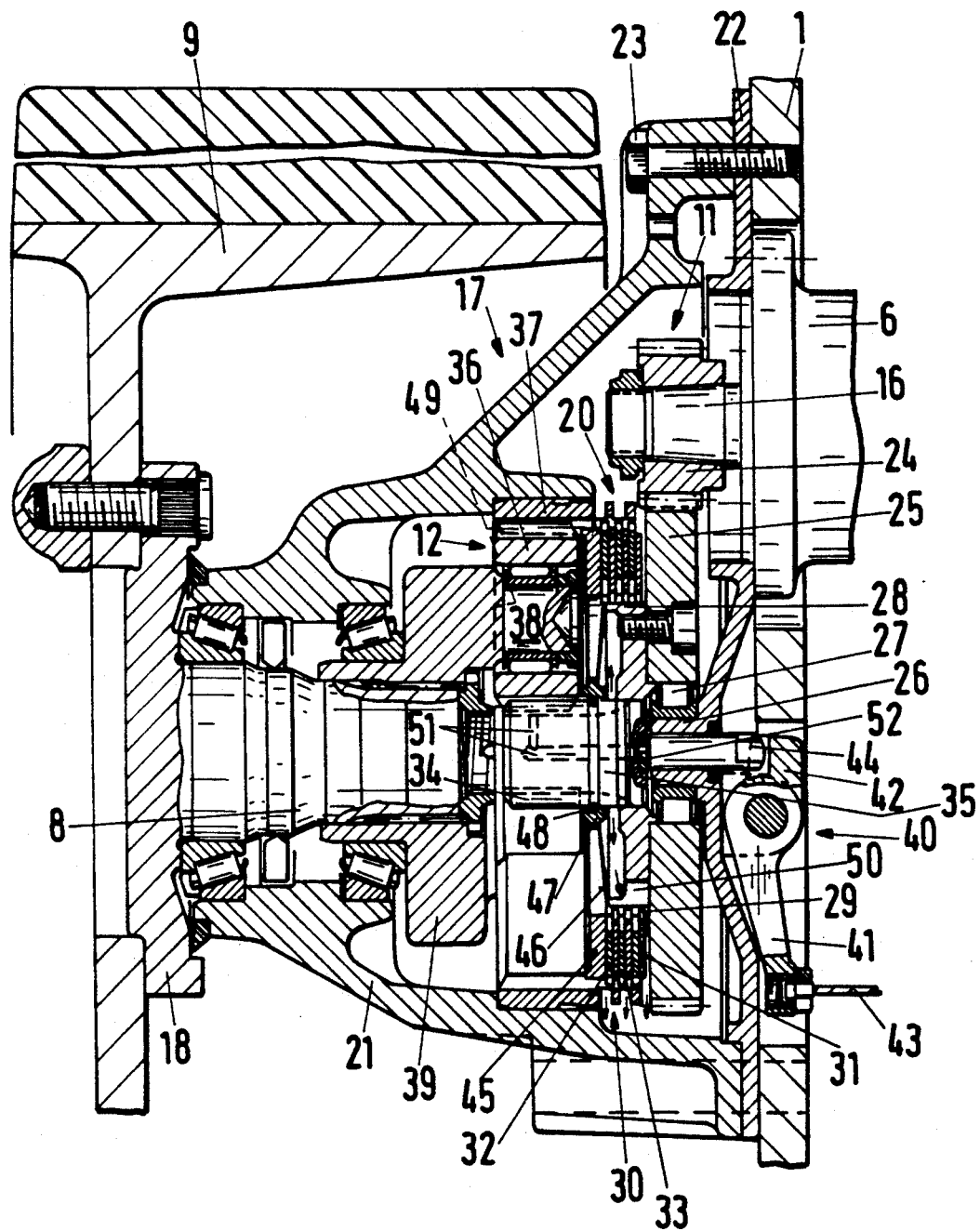
FIG. 5 is a longitudinal cross-sectional view of a two-step transmission with an integrated brake.

The transmission 17 of the drive unit 14, which transmission is more clearly illustrated in FIG. 5, is housed in a transmission housing 21 which is closed off with a lid 22 at one open side, which lid is mounted to the side frame member 1 by screws 23. The electric motor 6 (only a fragment thereof being shown) is secured to the lid 22. A motor shaft 16 projects through an opening in the lid into the transmission housing 21 and has a spur pinion 24 of a first transmission step 11 mounted fixed against relative rotation thereon. A spur gear 25 is supported rotatably and axially movably on a cylinder roller bearing 27 on a support sleeve 26 on the lid 22, which spur gear 25 meshes with the spur pinion 24. A first disk carrier 28 is fastened to the spur gear 25 and supports a plurality of first braking disks 31, hereinafter sometimes referred to as so-called inner disks, which are axially movable on an external tooth system 29 on the disk carrier 28. A second disk carrier 30, which will be discussed later on, is arranged fixed against rotation in the transmission housing 21 and supports a plurality of second braking disks 32, hereinafter sometimes referred to as so-called outer disks, which are axially movable in an internal tooth system 33 on the disk carrier 30.

The spur gear 25, driven by the spur pinion 24 or the first disk carrier 28 fastened thereto, terminates on the driven side thereof in a sun gear 34 of a spur gear planetary gearing 12. The sun gear 34, which for manufacturing reasons is produced as a separate part and is connected to a cylindrical shoulder 35 by electronic beam welding or in another suitable manner on the first disk carrier 28, mates with the planetary gears 36, which also mesh with the internal tooth system of a ring gear 37. The ring gear 37 is mounted fixed against rotation in the transmission housing 21 and has an axial extension thereon extending beyond the width of the planetary gears 36, which extension forms the aforementioned second disk carrier 30 so that the internal tooth system 33 of the disk carrier 30 is substantially identical to the internal tooth system of the ring gear. With this not only the space otherwise needed for fastening a disk carrier manufactured as a separate part is saved, but the two tooth systems can also be manufactured in one operation with the same tools.

The planetary gears 36 are each rotatably supported on a support sleeve 38, each forming a part of a planetary gear carrier 39. The carrier 39 is mounted on and fixed against relative rotation with respect to the wheel shaft 8 to form the driven shaft of the transmission 17, which wheel shaft 8 is rotatably supported by bearings and projects outwardly from the transmission housing 21 through an appropriate opening and terminates in a flange 18 to which the drive wheel 9 is secured, as by screws.

A two-arm lever 40 is hinged to the outside of the lid 22, which lever operates the brake 20 substantially formed by the first (inner) and second (outer) braking disks 31, 32 and integrated into the transmission. One lever arm 41 of the lever 40 is connected through a cable line 43 or through other means to a device, for example, a braking lever, which is not illustrated and is to be operated by the driver of the industrial truck. The other lever arm 42 of the lever 40 rests on one end of a pressure pin 44 extending through an opening therefor in the lid 22, the other end of which pressure pin 44 rests on the shoulder 35 of the sun gear 34. If the lever arm 41 is now pulled to the right by the cable line 43 as seen in FIG. 5, then the lever arm 42 presses the pressure pin 44 to the left, which in turn moves the sun gear 34 together with the first disk carrier 28 and the spur gear 25 in the same direction. The spur gear 25 compresses thereby the first (inner) and second (outer) braking disks 31, 32 and presses them against an annular bearing surface 45, which is connected fixed against rotation to the second disk carrier 30 and thus to the transmission housing 21. The industrial truck can be slowed down by the braking action created during a pressing together of the braking disks 31, 32 due to the friction between the braking disks and can be brought to a stop after the electric motor 6 has been turned off. A cup spring 46 is provided for easing or slightly releasing the braking disks 31, 32, when the braking action is supposed to be cancelled, and for returning the spur gear 25 together with the sun gear 34 and the lever 40 into their respective initial positions. The cup spring 46 is mounted in a space therefor on a support ring 47 movably mounted on the shoulder 35 of the sun gear 34 and rests with its peripheral area on a face of the first disk carrier 28. The support ring 47 is supported in the initial position, that is with an eased brake 20, on a snap ring 48 placed in a peripheral groove in the sun gear 24, which snap ring limits the axial movement of the spring and the support ring and thus assures a defined minimum easing clearance of the braking disks 31, 32. The snap ring 48 together with the sun gear 34 gives way to the left only during braking and the support ring 47 rests laterally on the planetary gears 36, while the planetary gears 36 are supported with their other flat sides on butting faces 49 of the planetary gear carrier 39.

The spur gear transmission 17 has a combined oil-bath and splash lubrication. The lubricating oil squeezed out of the mesh between the sun gear 34 and the planetary gears 36 is guided partly through the tooth gaps of the sun gear tooth system, which tooth gaps end in the shoulder 35, and through corresponding slots 50 in the first disk carrier 28 to the braking disks 31, 32 to reduce friction and discharge heat. A portion of the oil passes through bores 51 to the contact point of the pressure pin 44 on the shoulder 35, where a stop washer 52 is provided for an as much as even distribution of the oil. The oil flow is marked with small arrows in FIG. 5.

Figure 8:
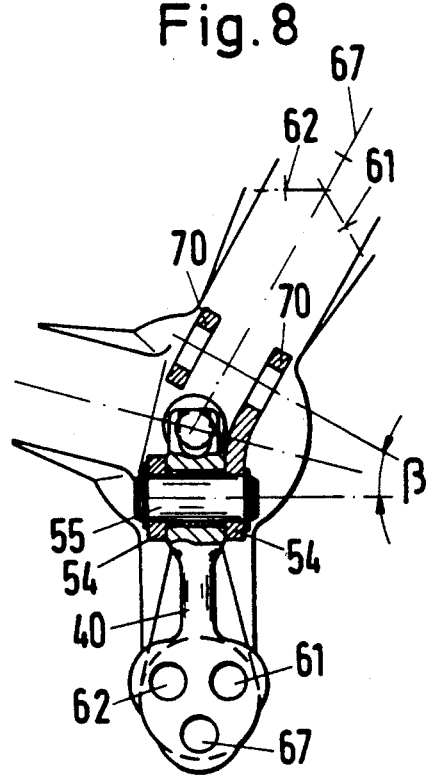
FIG. 8 is a partial view in arrow direction VIII.
Figure 7:
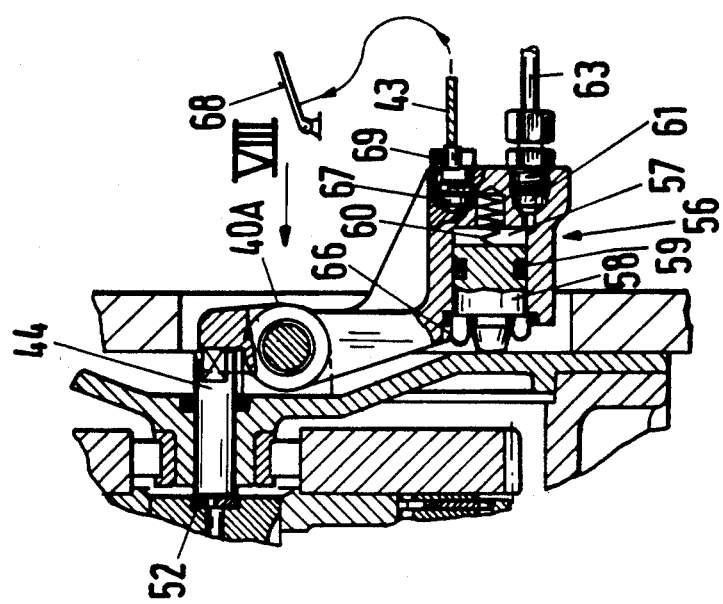
FIG. 7 is the lever of FIG. 6 in the "braking" position.
Figure 6:
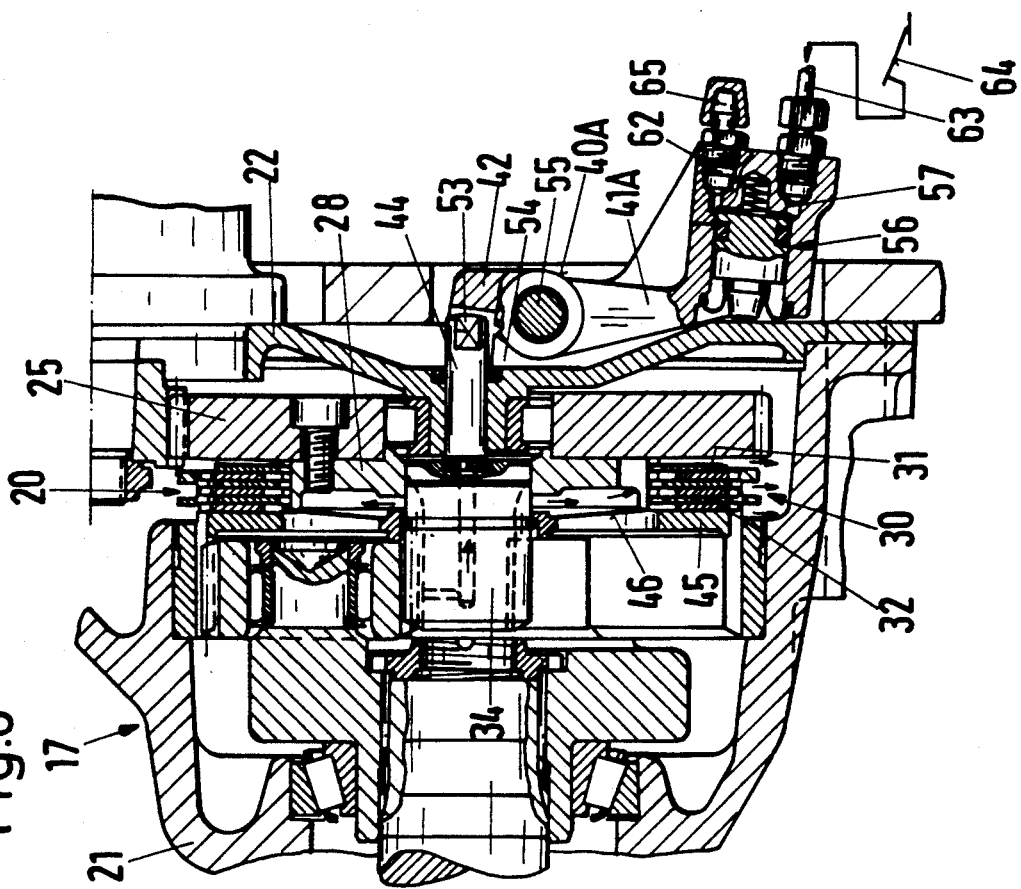
FIG. 6 is a partial cross-sectional view of the transmission with a device for facilitating hydraulic brake operation.

Other devices for operating the brake 20 integrated into the transmission are illustrated in greater detail in FIGS. 6 to 8. A two-arm lever 40A is hinged by means of a bolt 55 in a fork 54 on the outside of the lid 22 of the transmission housing 21, which lever differs in its design from the above-described lever 40. A hydraulic cylinder 56 having a pressure chamber 57 is provided in the longer lever arm 41A. A piston 58 is guided longitudinally movably in the pressure chamber 57. A portion of one side of the piston 58 exits from one end of the cylinder 56 and rests on the lid 22. A small spring 60 is provided on the other side of the piston 58 between the piston and an end wall of the pressure chamber 57 to <-> the piston 58 and the lid 22. The pressure chamber 57 is connected to two connecting bores 61, 62. A hydraulic pipeline 63 is screwed into one of the two connecting bores and is connected to a device, for example, a brake pedal 64, to be operated by the driver, while an air-relief valve 65 is screwed into the other connecting bore. The hydraulic pipeline 63 and the pressure chamber 57 are filled with a brake fluid depending on their use. A seal 59 on the piston 58 prevents leakage and a flexible sleeve 66 protects the piston 58 and the cylinder 56 against dirt.

The other, shorter lever arm 42 of the lever 40A rests against one end of the pressure pin 44, which by means of flat areas 53 on it and on the lever arm 42 is prevented from rotating in the lid 22. The pin 44 rests with its other end against the shoulder 35 of the sun gear 34 or rather against the stop washer 52 provided thereon. The oil utilized for lubrication resp. its flow is also indicated by small arrows in FIG. 6. If the pressure chamber 57 is now loaded with pressure by the action of the brake pedal 64, the lever arm 41A moves to the right as can be seen in FIG. 6, that is, the lever 40A carries out a counterclockwise pivoting movement causing the lever arm 42 to press the pressure pin 44 to the left. The pressure pin in turn moves the sun gear 34 together with the first disk carrier 28 and the spur gear 25 in the same direction. The spur gear 25 presses thereby the first and the second braking disks 31, 32 together and presses them against the annular stop 45, which is connected fixed against rotation to the second disk carrier 30 and thus to the housing 21. The industrial truck can be slowed down by the braking action created during the pressing together of the braking disks 31, 32 due to the friction between the braking disks. Besides this hydraulic operation as a wheel brake, there exists in addition a mechanical operation as a blocking brake. A third connection 67, designed as a pocket hole, is additionally provided for this purpose besides the two connecting bores 61, 62. A cable line 43 with a female screw 69, which cable line is connected to a manual brake lever 68, is fastened and secured against an unintended disengagement in the connection 67. In order to activate the brake 20, the lever arm 41A is pulled to the right by the cable line 43 with the same effect as above-described so that the vehicle can be stopped after the electric motor 6 has been turned off.

The easing of the braking disks 31, 32 when the braking action is supposed to be cancelled, and the return of the spur gear 25 together with the sun gear 34 and the lever 40A into their respective initial positions by means of the cup spring 46, which compared with the spring 60 has a substantially greater spring force, has been discussed above for the lever 40 and applies here as well.

FIG. 7 shows the lever 40A in the position it assumes during braking. In place of the air-relief valve 65, which is illustrated offset in FIG. 6, the connection 67 with the cable line 43, also offset, is here indicated. When the lever 40A, as shown in FIGS. 6 and 7, is a straight, thus not bent lever, then the axis of the cylinder 56 just like the connecting bores 61, 62 and the connection 67 will be arranged at least approximately parallel with respect to the pressure pin 44, because this is advantageous with respect to manufacturing and functioning.

FIGS. 3 and 4 show that the transmissions 17 are oriented at an angle α about the axis of the wheel shaft 8 and from the vertical. In order not to have different transmission housings 21, the lid 22 has aside of the already mentioned fork 54 a second fork 70, which is offset at an angle β with respect to the first one. It is advantageous, however, not absolutely necessary for β to equal 2α. FIG. 8 shows the two forks 54, 70 with the lever 40A in the fork 54. The hydraulic pipeline 63, the air-relief valve 65 and the cable line 43 have been left out for the purpose of a better understanding and only those positions are shown on the fork 70, which the connecting bores 61, 62 and the connection 67 assume when the lever 40A is supported in the fork 70. The lever 40A can also be put into the place of the lever 40 in FIGS. 3, 4.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A spur gear transmission for a drive unit of an industrial truck, comprising:
   a transmission housing;
   at least two spur gears supported in the transmission housing and meshingly engaged with one another;
   a first disk carrier arranged on one of the two spur gears, on which carrier at least one first braking disk is mounted fixed against relative rotation, however, is axially movable;
   a second disk carrier fastened in the transmission housing, on which carrier at least one second braking disk is mounted fixed against relative rotation, however, is axially movable, which second braking disk cooperates with the at least one first braking disk such that in an arrangement of several first braking disks and just as many second braking disks, these are arranged alternately in a conventional manner; and
   the one spur gear having the first disk carrier thereon being axially movable against the force of a spring by a pressure pin extending through the transmission housing and operable from outside such that the braking disks are pressed against one another between the one spur gear and a bearing surface in the transmission housing.

2. The spur gear transmission according to claim 1, wherein a two-step transmission is provided and comprises a spur gear planetary transmission as a second step, which spur gear planetary transmission consists of a sun gear, at least two planetary gears supported in a planetary gear carrier and a ring gear, the sun gear being connected to and against relative rotation with respect to the axially movable one spur gear of the first step.

3. The spur gear transmission according to claim 2, wherein the spring is a cup spring supported on a support ring arranged coaxially with respect to the sun gear and resting on the planetary gears.

4. The spur gear transmission according to claim 2, wherein the ring gear is fixedly mounted against rotation to the transmission housing and includes an axially extending extension means for facilitating a meshing engagement of the planetary gears, said extension means extending toward the axially movable one spur gear and defines in this area the second disk carrier and supports the bearing surface for the braking disks.

5. The spur gear transmission according to claim 1, wherein at least two forks are provided on the transmission housing and are offset with respect to one another at an angle β, for the optional receiving of a lever.

* * * * *